United States Patent
Stiller et al.

(10) Patent No.: US 7,553,470 B2
(45) Date of Patent: Jun. 30, 2009

(54) METHOD OF CONTROLLING SWELLING AND SHRINKAGE DURING SYNTHESIS OF COKE

(75) Inventors: Alfred Stiller, Morgantown, WV (US); Chong Chen, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 1276 days.

(21) Appl. No.: 10/772,920

(22) Filed: Feb. 5, 2004

(65) Prior Publication Data

US 2004/0228789 A1    Nov. 18, 2004

Related U.S. Application Data

(63) Continuation-in-part of application No. 10/004,781, filed on Dec. 4, 2001, now Pat. No. 6,797,251.

(60) Provisional application No. 60/255,377, filed on Dec. 13, 2000.

(51) Int. Cl.
*C01B 31/02*     (2006.01)

(52) U.S. Cl. .................................. 423/445 R

(58) Field of Classification Search ............. 423/445 R
See application file for complete search history.

(56) References Cited

U.S. PATENT DOCUMENTS 6,797,251 B1 *   9/2004   Bennett et al. .......... 423/445 R

* cited by examiner

*Primary Examiner*—Stuart Hendrickson
(74) *Attorney, Agent, or Firm*—Eckert Seamans Cherin & Mellott, LLC; Arnold B. Silverman, Esq.

(57) ABSTRACT

Methods of treating a carbon foam precursor to facilitate subsequent foaming of the material at low pressures, which may be on the order of about 0.5 to 1.5 atmospheres, are disclosed. In one embodiment, the carbon foam precursor is subjected to partial devolatilization under controlled conditions with subsequent foaming being effected at low pressure. The carbon foam precursor may be one of various forms of coal including raw coal, coal extract mesophase pitch, synthetic mesophase pitch or petroleum based pitch. The performing treatment of the carbon foam precursor may remove a portion of the internal blowing agent and may alter the fluidity of the carbon foam precursor matrix. In another embodiment, the precursor after being converted into a powder is subjected to oxidation prior to foaming. In another embodiment of the invention a high density carbonaceous material is produced by oxidizing a carbonaceous feedstock to remove from the feedstock volatile gases followed by solvent treatment to remove hydrocarbons thereby providing a carbonaceous feedstock which when coked will produce a material of higher density.

47 Claims, 3 Drawing Sheets

METHOD OF CONTROLLING SWELLING AND SHRINKAGE DURING SYNTHESIS OF COKE

CROSS REFERENCE TO RELATED APPLICATION

This application is a continuation-in-part of U.S. Ser. No. 10/004,781 filed Dec. 4, 2001 entitled "Method o Making Carbon Foam at Low Pressure" which in turn claimed the benefit of United States Provisional Application Ser. No. 60/255,377, filed Dec. 13, 2000.

BACKGROUND OF THE INVENTION

1. Field of the Invention

The present invention relates to a method of making an improved carbon foam material and particularly such a method which involves treatment of a carbon foam precursor followed by a low pressure foaming. In another embodiment of the invention, a carbonaceous feedstock is subjected to oxidation to create a partially devolatilized carbon precursor extract and subsequent solvent treatment to dissolve at least a portion of the hydrocarbon molecules and, thereby, facilitate production by coking of a carbonaceous material having a high density.

2. Description of the Prior Art

It has been known for many decades that coal can be beneficiated for application in a wide variety of environments. For example, it has been known that coal may be employed as a fuel in electric utility plants and, in respect of such usages, beneficiating of the coal will reduce the ash content and the amount of sulfur and nitrogen species contained in the gaseous exhaust products.

It has also been known to convert coal into coke for use in various process metallurgy environments.

It has also been known to create carbon foam materials from feedstocks other than coal, which can be glassy or vitreous in natures and are brittle and not very strong. These products which lack compressive strength tend to be very brittle and are not graphitizable. See, generally, Wang, "Reticulated Vitreous Carbon—A New Versatile Electrode Material," Electrochimica Acta, Vol. 26, No. 12, pp. 1721-1726 (1981) and "Reticulated Vitreous Carbon An Exciting New Material," Undated Literature of ERG Energy Research and Generation, Inc. of Oakland, Calif.

It has been known through the analysis of mechanical properties of carbon fibers that long-range crystallite orientation is achieved by alignment of the precursor molecules during fiber spinning. In "Idealized Ligament Formation in Geometry in Open-Cell Foams" by Hager et al., 21st Biennial Conference on Carbon, Conf. Proceedings, American Carbon Society, Buffalo, N.Y., pp. 102-103 (1993), a model analysis regarding interconnected ligament networks to create geometric evaluation of hypothetical ligamentous graphitic foam is disclosed. This model analysis, however, does not indicate that graphite foam was made or how to make the same.

It has been suggested to convert synthetic naphthalenic mesophase pitch into a carbon foam product by employing a blowing/foaming agent to create bubbles in the material, followed by graphitization of the resultant carbonized foams above 2300° C. See "Graphitic Carbon Foams: Processing and Characterizations" by Mehta et al., 21st Biennial Conference on Carbon, Conf. Proceedings, American Carbon Society, Buffalo, N.Y., pp. 104-105 (1993). It is noted that one of the conclusions stated in this article is that the mechanical properties of the graphitic cellular structure were quite low when compared to model predictions.

It has been known to suggest the use of graphitic ligaments in an oriented structure in modeling related to structural materials. See "Graphitic Foams as Potential Structural Materials," Hall et al., 21st Biennial Conference on Carbon, Conf. Proceedings, American Carbon Society, Buffalo, N.Y., pp. 100-101 (1993). Graphitic anisotropic foams, when evaluated mathematically in terms of bending and buckling properties, were said to have superior properties when compared with other materials in terms of weight with particular emphasis on plate. structures. No discussion of compressive properties is provided.

In "Carbon Aerogels and Xerogels" by Pekala et al., Mat. Res. Soc. Symp. Proc., Vol. 270, pp. 3-14 (1992), there are disclosed a number of methods of generating low-density carbon foams. Particular attention is directed toward producing carbon foams which have both low-density (less than 0.1 g/cc) and small cell size (less than 25 microns). This document focuses upon Sol-gel polymerization which produces organic-based Aerogels that can be pyrolyzed into carbon Aerogels.

In "Carbon Fiber Applications," by Donnet et al., "Carbon Fibers," Marcel Decker, Inc., pp. 222-261 (1984), mechanical and other physical properties of carbon fibers were evaluated. The benefits and detriments of anisotropic carbon fibers are discussed. On the negative side are the brittleness, low-impact resistance and low-break extension, as well as a very small coefficient of linear expansion. This publication also discloses the use of carbon fibers in fabric form in order to provide the desired properties in more than one direction. The use of carbon fibers in various matrix materials is also discussed. A wide variety of end use environments, including aerospace, automotive, road and marine transport, sporting goods, aircraft brakes, as well as use in the chemical and nuclear industries and medical uses, such as in prostheses, are disclosed.

It has been known to make carbon fibers by a spinning process at elevated temperatures using precursor materials which may be polyacrylonitrile or mesophase pitch. This mesophase pitch is said to be achieved through conversion of coal tar or petroleum pitch feedstock into the mesophase state through thermal treatment. This thermal treatment is followed by extrusion in a melt spinning process to form a fiber. The oriented fiber is then thermoset and carbonized. To make a usable product from the resulting fibers, they must be woven into a network, impregnated, coked and graphitized. This involves a multi-step, costly process. See "Melt Spinning Pitch-Based Carbon Fibers" by Edie et al., Carbon, Vol. 27, No. 5, pp. 647-655, Pergamen Press (1989).

U.S. Pat. No. 5,705,139 discloses a method of employing the solvent extraction process of U.S. Pat. No. 4,272,349 as a basis for selecting a particular coal extract of bituminous coal to produce isotropic coke and graphite from solid extracts obtained by non-destructive solvent treatment of coal. These materials are all solid. The patent also acknowledges the existence of petroleum pitch which is said to have certain prior uses in respect of a binder pitch, as well as possible use as a raw material for graphite or other carbon articles, but is said to suffer the same disadvantages as petroleum coke.

It has been known to heat carbonaceous feedstocks to create coke at temperatures of about 350° C. to 800° C. depending on the nature of the carbonaceous material. The heat serves to drive off the volative gases leaving behind a carbon residue which is referred to as "coke". Coke usually has a certain degree of porocity as outgassing volatile gases form bubbles. Highly porous coke is generally referred to as "foam".

U.S. Pat. No. 3,960,770 discloses a means of producing a porous coke employing a polymer precursor.

U.S. Pat. No. 5,626,977 discloses a method of using carbon aerogels to create carbon foams said to be suitable for use as electrodes.

U.S. Pat. No. 6,323,160 discloses a product for densifying carbon foam using carbonaceous material as a filler material.

U.S. Pat. No. 3,917,806 discloses a specific preferred means of preparing a porous carbon molding having a low density which involves mixing a specific pitch with at least one aromatic hydrocarbon and immersing the mixed material in a solvent in which the pitch is not highly soluble, but the aromatic hydrocarbon is, followed by calcining the infusible porous material. The product is created by etching action rather than volatilization.

U.S. Pat. No. 4,025,689 discloses the use of a carbonaceous substance which may be petroleum coke, pitch coke, graphite, coal, charcoal or carbon black in making a graphitized hollow sphere wherein a foamed polystyrene coated with a carbonaceous powder and binder are heated to volatilize the core in making the porous article.

U.S. Pat. No. 4,289,604 discloses a method for manufacturing isotropic coke from a tar or tar pitch.

U.S. Pat. No. 5,888,469 discloses methods of making either anisotropic carbon foam material or isotropic carbon foam material employing coal as a starting material with processing in one embodiment including hydrogenating the coal followed by de-ashing, separation of asphaltenes, coking and graphitizing and in another following a similar process, but not involving hydrogenating the coal.

There remains, therefore, a very real and substantial need for an improved method of making a carbon foam product which involves specific treatment of a carbon foam precursor so as to facilitate creating a foam material with low pressure processing. There is also a need for a method of pretreating a carbonaceous feedstock to create a partially devolatilized carbon precursor extract which will be treated by solvent and thereby facilitate coking.

SUMMARY OF THE INVENTION

The present invention has met the above-described needs.

In one embodiment, the method involves providing a carbon foam precursor which may be raw bituminous coal, other coal extracts, mesophase pitches, synthetic mesophase pitches, or petroleum based pitches. The carbon foam precursor in one embodiment is heated to remove a portion of the volatiles and create a devolatilized coal extract. This is heated in an inert gas environment with either the inert gas flowing therethrough to remove the volatiles that are freed from the material or under a stagnant inert gas mass. The material is subsequently cooled and converted to a powder which is introduced in a vessel and in an inert gas environment is subjected to foaming at a low pressure which preferably is on the order of about less than 1.5 atmospheres and, preferably, about 0.5 to 1.5 atmospheres. The foamed material is subsequently cooled.

In another embodiment of the invention, a carbon foam precursor is converted into a powder and is subjected to oxidation. It is then subjected to foaming in a suitable mold and suitable vessel containing an inert gas at a pressure of less than about 20 atmospheres and, preferably, about 0.5 to 1.5 atmospheres.

If desired, with either embodiment, the treated carbon foam precursor may be stored in an inert environment prior to foaming.

A method of making a coked carbon material includes providing a carbonaceous-feedstock which is oxidized to remove a portion of the volatiles therefrom and create a partially devolatized precursor extract which is subsequently cooled and converted into a powder. The powder is treated with a solvent to dissolve at least a portion of the hydrocarbon molecules contained therein followed by separation of the solvent and dissolved hydrocarbon from the powder. The powder is introduced into a sealed vessel and coking of the devolatilized precursor extract is effected followed by cooling of the material. The oxidation is preferably effected at a temperature of about 100 to 500° C. at about ambient pressure. The oxidation effects removal of at least a portion of the carbon feedstock volatile gases and subsequent solvent treatment serves to reduce the hydrogen content thereof.

This method produces a carbon material which has a high density which may be on the order of at least about 1.4 g/cm$^3$. Certain preferred carbonaceous feedstocks and solvents are recited.

It is an object of the present invention to provide methods of creating carbon foam at low pressure.

It is another object of the present invention to provide such methods wherein a pretreatment of a carbon foam precursor alters the physical characteristics of the precursor thereby facilitating low pressure foaming.

It is a further object of the present invention to provide such methods which may be employed to create a foam carbon material at a low pressure while yielding desired physical properties of the resultant foam.

It is another object of the present invention to provide such process which may be employed to convert raw bituminous coal into a carbon foam at low pressures.

It is a further object of the present invention to provide a method of creating a carbonaceous material having a high density and controlled void fraction without requiring hot pressing.

It is a further object of the present invention to provide such a method which may be employed in an economical way.

It is another object of the present invention to provide such a method which can produce shrinkage of the carbonaceous feedstock in the mold to enhance density.

It is yet another object of the present invention to provide a method of controlling the swelling or shrinkage of carbonaceous feedstock material as they are coked to produce a carbon foam or solid substantially monolithic carbon, as desired.

These and other objects of the invention will be more fully understood from the following detailed description of the invention on reference to the illustrations appended hereto.

DESCRIPTION OF THE PREFERRED EMBODIMENTS

As employed herein, the term "carbon foam precursor" means a carbon based material which after the treatment may be foamed under the influence of heat and low pressure and shall expressly include, but not be limited to, raw coal, coal extract, de-ashed coal extract, un-ashed coal extract, hydrogenated coal extract, de-ashed hydrogenated coal extract, mesophase pitch, including synthetic mesophase pitch, and petroleum based pitch.

Figure 1:
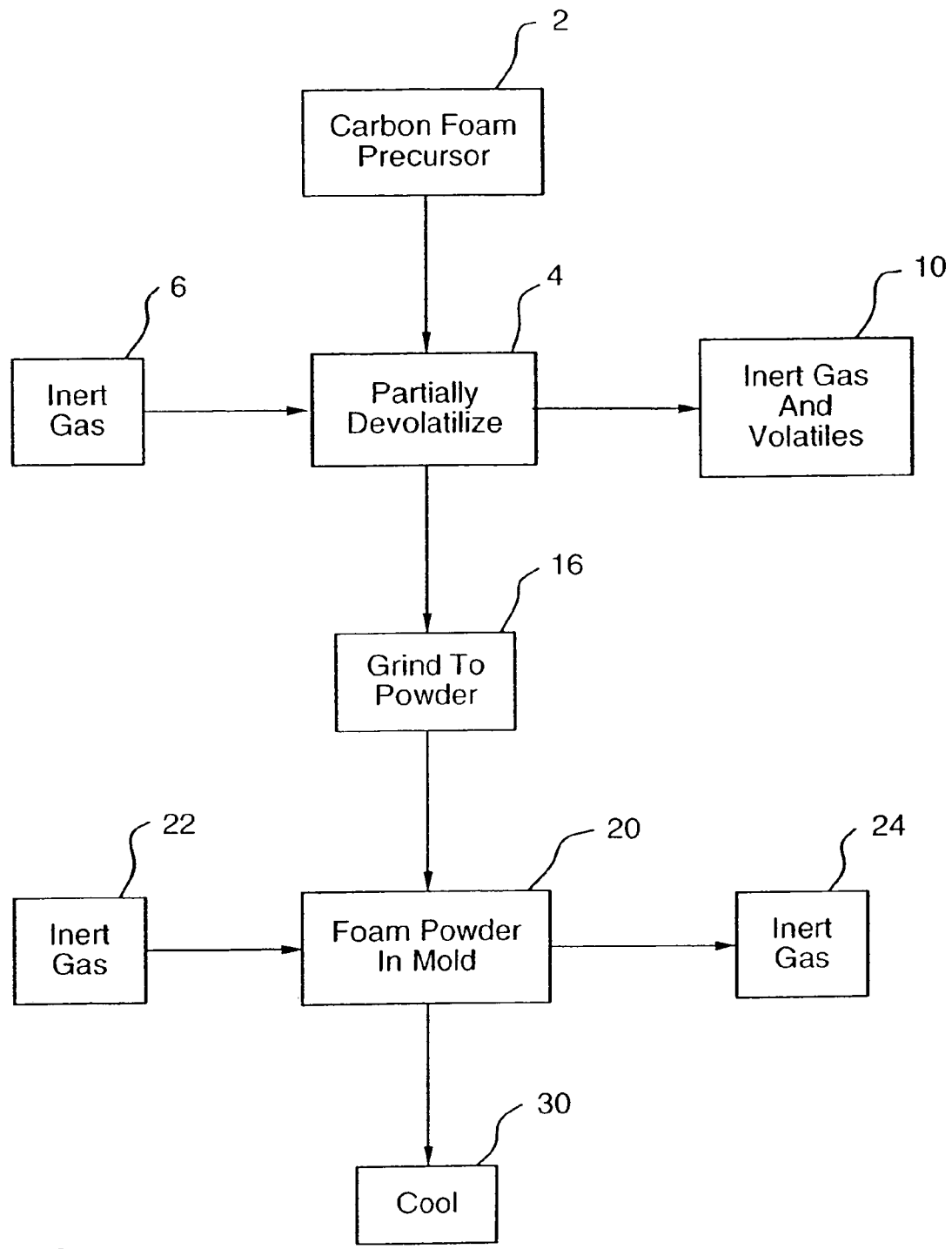
FIG. 1 is a schematic illustration of one embodiment of the method of the present invention.

Referring in greater detail to FIG. 1, a first embodiment of the process of the present invention will be considered.

As shown in FIG. 1, a carbon foam precursor 2, which for purposes of example, may be considered to be raw bituminous coal is partially devolatilized 4 at an elevated temperature which may be on the order of about 100° C. to 720° C. and, preferably, about 150° C. to 500° C. for about 1 minute to 12 hours. This is preferably accomplished in a steel vessel which is sealed and has an inert gas 6, such as nitrogen, argon or helium blanketing the system and flowing therethrough so as to carry the volatilized material out of the vessel 10 to a retort or hood exhaust. If desired, while not preferred, the inert gas can be a blanket which does not flow. All that is desired is that the system be purged of oxygen prior to devolatilization or foaming with either stagnant inert gas or inert gas flow 22, 24. This devolatizing pretreatment of the carbon foam precursor serves to remove sufficient quantities of the internal blowing agent and to change the fluid nature of the matrix or viscosity thereof so as to facilitate the subsequent ability to foam the material in creating the desired physical and mechanical properties of the ultimate foam while foaming at a low pressure. Subsequent to the partial devolatilization, the material is reduced to powder form 16 as by grinding, preferably, to create a powder in the range of about 10 to 325 mesh and, preferably, about 60 to 200 mesh. This powder may then be stored, if desired, in an inert atmosphere until such time as it is desired to foam the material.

The powder, when it is to be foamed, may be placed in mold forms and then introduced into a thick walled sealed vessel wherein foaming 20 is effected at an elevated temperature and a pressure preferably less than about 20 atmospheres and most preferably in the range of about 0.5 to 1.5 atmospheres. This may be accomplished at a temperature of about 380° C. to 600° C. under an inert gas atmosphere, such as nitrogen, either flowing through the foaming vessel 20 and emerging at 24 or stagnant. The system is heated to achieve the desired foaming temperature, preferably at the rate of about 0.01° C. to 60° C./min with a practical rate of 2° C./min. The system is maintained at the foaming temperature for about 1 minute to 6 hours and then is permitted to cool 30 to room temperature. The foam may then be removed.

Figure 2:
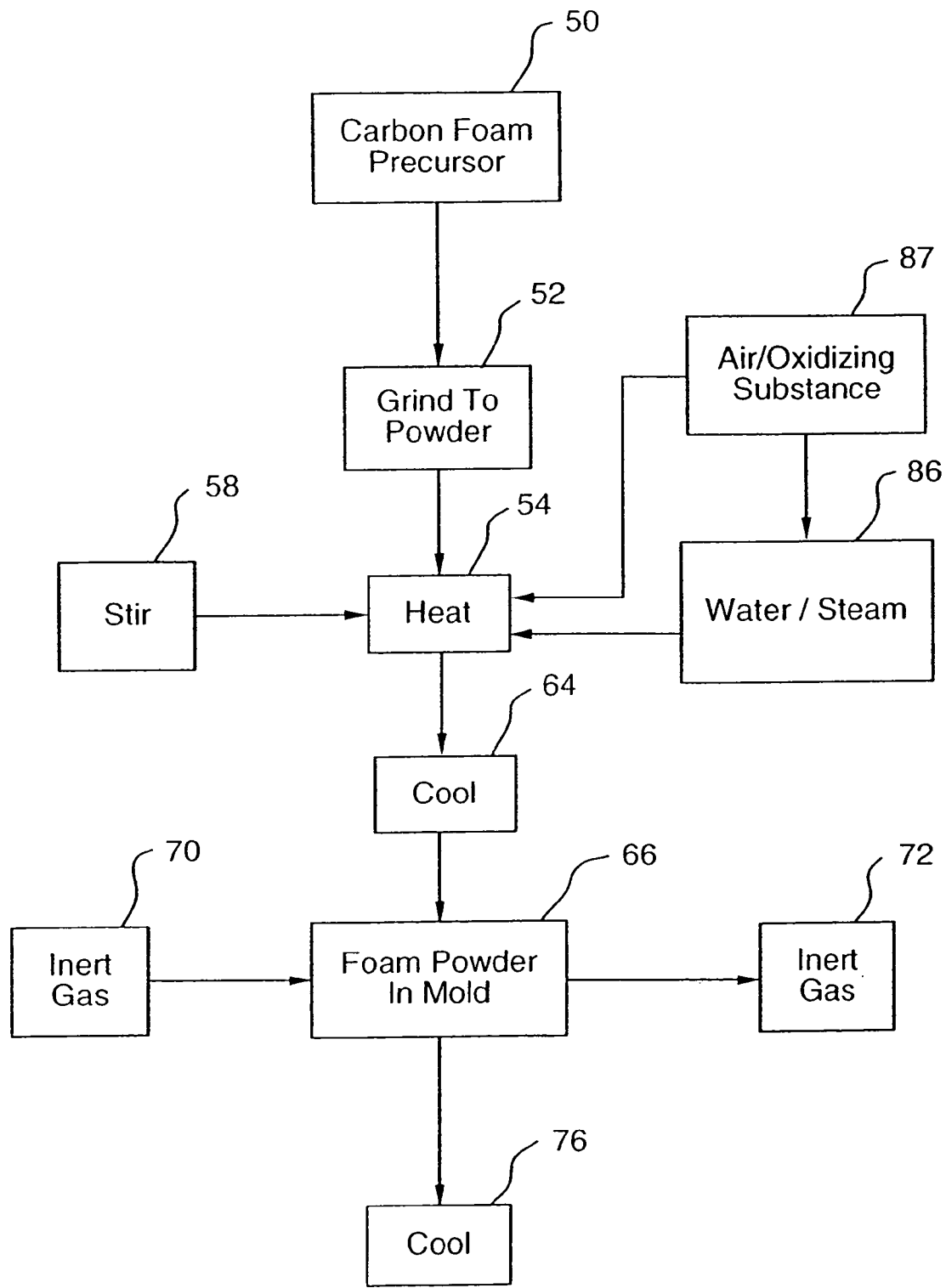
FIG. 2 illustrates schematically a second embodiment of a method of the present invention.

Referring to FIG. 2, a second embodiment of the invention will be considered. In this embodiment, a carbon foam precursor 50 is reduced to powder form as by grinding 52. The powder preferably has a size of about 10 to 35 mesh. The powder is then introduced into an oven 54 to heat the same at generally atmospheric pressure with the oven preferably being exposed to the air (or an oxygen gas/mixture). Heating may take place at about 20° C. to 500° C. and, preferably, about 100° C. to 225° C. for about 1 minute to 72 hours at a pressure of less than 20 atmospheres and, preferably, less than about 1.5 atmospheres in order to effect oxidation thereof. Oxidation occurs more rapidly at the higher times and temperatures. The oxidation serves to stabilize the matrix fluid. Preferably, the materials are stirred periodically to ensure uniform stabilization. Stirring, for example, may occur about every 10 to 20 minutes. The powder is then permitted to cool to room temperature after which it may be stored in an inert atmosphere prior to foaming. The powder is then placed in molds which, in turn, are placed in a sealed reaction vessel 66 for foaming at a temperature of about 330° C. to 600° C. for a period of about 1 minute to 6 hours. An inert gas 70, such as nitrogen, may flow over the powder in the sealed foaming vessel and emerges therefrom at 72. The material is then cooled 76 or allowed to cool to about room temperature after which they may be removed from the vessel. If desired, the oxidation and foaming may be effected in the same vessel with an intermediate flush or purge with an inert gas to remove unabsorbed oxygen.

If desired, water or steam may be introduced into the environment wherein the precursor is heated at 54 as shown by the rectangle 86. This admixture of water or steam facilitates efficient oxidation at the particle surface. A source of air or oxidizing substance 87 may be connected directly to the heating vessel 54 or may be connected to the source 86 of water/steam and then be introduced into heating vessel 54.

If desired for carbon foam precursor materials which have less reactive matrix material, such as mesophase pitches, one may partially devolatilize the material initially as described in connection with the FIG. 1 embodiment and subsequently perform the process of FIG. 2 thereon in order to oxidize the same followed by the low pressure creation of the foam.

In order to provide additional disclosure regarding the invention, an example will be provided. In this example, the precursor is devolatilized followed by foaming.

EXAMPLE 1

Three vessels, each containing one-half cup of the NMP (N-methyl pyrrolidone) extracted bituminous coal were in the reactor in a reactor which was sealed and purged with nitrogen gas. The samples were heated to 385° C. at a rate of 2° C./min. and retained at that temperature for 2 hours under a constant nitrogen purge. The samples were allowed to cool to room temperature. These samples exhibited an approximate 20% increase in volume and were porous indicating slight devolatilization. A very strong, dense carbon foam resulted. A second batch of samples of the same extract material was heated to 400° C. with all of the other conditions of the first batch being the same. This resulted in a foam that was very friable and low density. The volumetric expansion was around 1.5 to 2 times the original volume (indicating significantly more devolatilization at 400° C. than at 385° C.) These samples were ground into a fine powder separately employing a mortar and pestle and the cups were filled approximately one-half with powder. Samples of both the 385° C. powder and the 400° C. powder were placed in the reactor and the reactor was sealed and purged with nitrogen. The reactor was programmed to heat to 500° C. at the rate of 2° C./min. and hold at that temperature for 2 hours under stagnant nitrogen atmosphere. After cooling, the reactor gases were vented and the reactor opened. Good quality foam samples were obtained thereby indicating that sufficient volatiles were present to facilitate foaming, but that not so much as to result in large and inconsistent bubble sizes associated with the poor quality foams produced without the devolatilization step.

EXAMPLE 2

This example involves foam production by oxidation of the precursor.

The portion of a bituminous coal soluble in NMP was extracted and dried. The material was then ground to particle sizes of approximately 75 μm. The powder was spread into a thin layer in a shallow dish and placed in an oven preheated to 125° C. Samples of the material were heated/oxidized in open air for 30, 60, and 90 minutes with stirring being performed every 10 to 15 minutes. After the specified period of time had elapsed for heating/oxidation, the powder sample was removed from the oven and allowed to cool for approximately 30 minutes. The powder samples were then placed in aluminum molds. The mold was filled to no more than ⅓ of mold volume to allow for expansion. The aluminum mold(s) were placed in an autoclave reactor and the reactor sealed and placed in a kiln. A nitrogen inlet and outlet was connected to the reactor and a light nitrogen flow (approximately 10 cc/min) was established over the sample. The sample was heated to 400° C. at a rate of 2° C. per minute and held at that temperature for 2 hours under constant nitrogen purge. After the reactor had cooled to room temperature, the nitrogen flow was ceased and the reactor opened for inspection.

The foam samples produced from the extract oxidized for 30 and 60 minutes both appeared to double in volume and produce a nice foam. The sample oxidized for 90 minutes looked poor and was obviously over-oxidized (particles merely sintered).

The remaining samples were heated to 500° C. at a rate of 2° C./min and held at that temperature for 2 hours under constant nitrogen flow (to further coke the samples and ensure no further fluidization would occur). After cooling, the samples were removed and observed. The samples showed no change in appearance from the previous heat treatment. Samples were cut with an abrasive saw to view the bubble-size distribution throughout the piece. The bubbles were very small and good bubble-size distribution was evidenced within the pieces.

It will be appreciated that the present invention provides methods of making carbon foam which, due to pretreatment of carbon foam precursors, permits subsequent foaming at low pressure.

In another object of the present invention, a method of producing a carbonaceous material which results from coking of a pretreated carbonaceous feedstock produces carbon foam with an increased density compared to prior processes or solid carbon, as desired. This is accomplished by reducing the volatile chemical content including hydrogen of the carbonaceous feedstock and, thereby, reducing the fluidity of the material.

Figure 3:
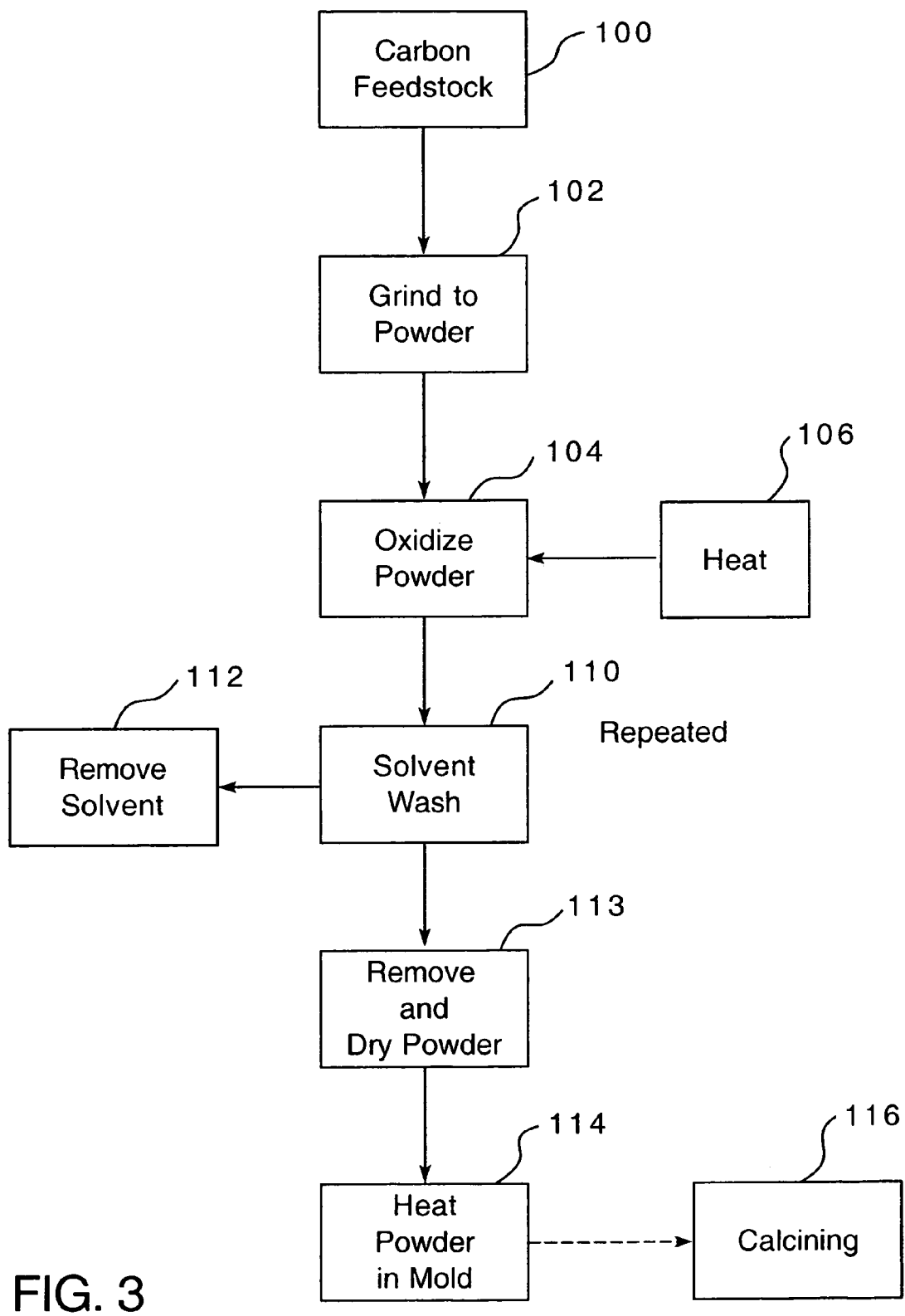
FIG. 3 is a schematic illustration of a third embodiment of the invention wherein the extent of foaming is controlled so as to produce a high density carbonaceous material.

Referring to FIG. 3, a preferred approach to this embodiment will be considered. In this embodiment, a carbon feedstock 100 is ground to powder 102 which, preferably, has a mesh of about 10 to 325 and preferably about 60 to 200 mesh. The powder is then oxidized 104 through applied heat 106 at a temperature of about 100 to 500° C. and a pressure of about 0.5 to 1.5 atmospheres. Oxidation of the powder at a temperature of about 100 to 500° C. serves to remove from the carbon feedstock powder volatile gases. It also serves to reduce the hydrogen content of the feedstock.

Among the suitable materials employable for carbon feedstock are those selected from the group consisting of petroleum pitch, petroleum tar, coal pitch, coal tar, gasification tar, rubber, and combinations thereof. Additional suitable materials are those selected from the group consisting of recycled motor oil, biomass derivatives, shale oil and combinations thereof. Suitable solvents are those selected from the group consisting of acetone, quinoline, toluene, alcohol, xylene, methylethylketone, carbon tetrachloride, trichloroethylene and combinations thereof.

The oxidized powder is then subjected to solvent washing 110 in a suitable solvent which dissolves a portion of the hydrocarbon molecules which are then removed 112 along with the solvent by means such as proportion centrifugation or evaporation as well as combinations thereof. The treated carbonaceous feedstock is then removed and dried 113 after which it is introduced into a mold and coked 114 at a temperature of about 330 to 600° C. for about 1 minute to 12 hours. If desired, after coking the material may be subjected to calcining 116.

Material produced in this manner will provide a foam which has increased density and generally will be in excess of $1.4 \text{ g/cm}^3$.

It will be appreciated that in this embodiment as a result of the pretreatment, the withdrawal of volatile materials and hydrogen provide less materials within the carbonaceous feedstock to create bubbles and, thereby, permit shrinkage and increased density to occur during coking automatically. This eliminates the need to produce a product which goes through the foam stage. Calcination 116, if performed, tends to improve the strength and modulus of the material.

EXAMPLE 3

An example of this embodiment would involve grinding a pitch to −100 mesh to produce a granulated powder followed by the carbonaceous powder feedstock being placed in a rotating tube furnace and heated at about 350° C. for about 15 minutes with the result being significant oxidation of the powder. The powder is then washed in stirred acetone at ambient temperature and the acetone containing dissolved organic chemicals are removed using filtration or centrifugation or factional distillation. The remaining material is dried to create a treated powder. The dried treated powder is placed in a mold made of a noncarbide forming material such as aluminum. The mold is placed in a heated autoclave and slowly ramped to a high temperature with a typical temperature ramp rate being about 1 to 15° C./minute with a maximum temperature of about 500° C. at near ambient pressure.

In another preferred embodiment solvent extracted carbon ore "SECO" may be employed in lieu of the pitch. This may be synthesized in accordance with the teachings of U.S. Pat. No. 5,955,375 in which a solvent is used to partially dissolve coal after which the insoluble portion is removed, the remainder dried to result in SECO.

Whereas particular embodiments of the invention have been described herein for purposes of illustration, it will be evident to those skilled in the art that numerous variations of the details may be made without departing from the invention as set forth in the appended claims.

The invention claimed is:

1. A method of making a carbon material comprising
providing a carbonaceous feedstock,
oxidizing said carbonaceous feedstock to remove a portion of the volatiles therefrom and create a partially devolatilized precursor extract,
cooling said devolatilized precursor extract,
converting said devolatilized extract into a powder,
treating said powder with a solvent to dissolve at least a portion of the hydrocarbon molecules contained therein,
separating said solvent and said dissolved hydrocarbons from said powder,
introducing said powder into a sealed vessel,
coking said devolatilized carbonaceous extract powder, and
cooling said coked material.

2. The method of claim 1 including
effecting said oxidation at a temperature of about 100 to 500° C.

3. The method of claim 2 including
effecting said oxidation on said powder having a mesh size of about 60 to 200.

4. The method of claim 3 including
effecting said oxidation at a pressure of about 0.5 to 1.5 atmospheres.

5. The method of claim 1 including
effecting by said oxidation removal from said carbon feedstock of volatile gases.
6. The method of claim 5 including
effecting by said oxidation reduction in hydrogen content of said carbon feedstock.
7. The method of claim 1 including
effecting by said oxidation depletion of the transferable hydrogen in said carbon feedstock to thereby decrease the fluidity thereof.
8. The method of claim 1 including
effecting said separation of solvent and dissolved hydrocarbons by at least one method selected from the group consisting of filtration, centrifugation and evaporation.
9. The method of claim 1 including
producing by said method a carbon material having a density of at least 1.4 g/cm$^3$.
10. The method of claim 1 including
selecting said carbonaceous feedstock from the group consisting of petroleum pitch, petroleum tar, coal pitch, coal tar, gasification tar, rubber, and combinations thereof.
11. The method of claim 1 including
selecting said carbonaceous feedstock from the group consisting of recycled motor oil, biomass derivatives, shale oil and combinations thereof.
12. The method of claim 1 including
selecting said solvent from the group consisting of acetone, quinoline, toluene, alcohol, xylene, methylethylketone, carbon tetrachloride, trichloroethylene and combinations thereof.
13. The method of claim 1 including
selecting as said solvent an organic solvent.
14. The method of claim 1 including
wherein said solvent is an ionic liquid.
15. The method of claim 1 including
effecting said coking in an inert gas environment.
16. The method of claim 1 including
creating said powder with a size of about 10 to 325 mesh, and
effecting said partial devolatilization under an inert gas environment.
17. The method of claim 1 including
effecting said foaming under an inert gas environment.
18. The method of claim 1 including
effecting said foaming at a pressure of about 0.5 to 1.5 atmospheres.
19. The method of claim 18 including
effecting said coking at a temperature of about 330° to 600° C. for about 1 minute to 6 hours.
20. The method of claim 19 including
effecting said heating to devolatilize said carbon foam precursor to a temperature of about 100° to 720° C.
21. The method of claim 19 including
creating said devolatilized carbon foam precursor powder with a size of about 10 to 325 mesh.
22. The method of claim 1 including
effecting by said partial devolatilization of said carbon foam precursor by alteration of the fluid nature of the matrix of said heated carbonaceous feedstock.
23. The method of claim 1 including
employing bituminous coal as said carbonaceous feedstock.
24. The method of claim 1 including
employing coal extract as said carbonaceous feedstock.
25. The method of claim 24 including
employing a material selected from the group consisting of de-ashed coal extract and un-ashed coal extract as said carbonaceous feedstock.
26. The method of claim 1 including
employing mesophase pitch as said carbonaceous feedstock.
27. The method of claim 1 including
employing petroleum based pitch as said carbonaceous feedstock.
28. The method of claim 1 including
after said partial devolatilization, but before said coking, storing said devolatilized powder.
29. The method of claim 2 including
employing stagnant inert gas as said inert gas environment.
30. The method of claim 2 including
employing flowing inert gas as said inert gas environment.
31. The method of claim 17 including
employing stagnant inert gas as said inert gas environment.
32. The method of claim 17 including
employing flowing inert gas as said inert gas environment.
33. A method of making a carbon foam material comprising
providing a carbonaceous feedstock,
creating a powder of said carbonaceous feedstock,
heating said powdered carbonaceous feedstock at a pressure of about 0.5 to 1.5 atmospheres at a temperature of about 100 to 500° C.,
treating said powder with a solvent to dissolve at least a portion of the hydrocarbon molecules contained therein,
heating said oxidized carbonaceous feedstock in an inert gas environment to a temperature of about 330° C. to 600° C. to coke said powdered precursor, and
cooling said foam to room temperatures.
34. The method of claim 33 including
effecting said coking an inert gas environment.
35. The method of claim 33 including
employing bituminous coal as said carbon foam precursor.
36. The method of claim 33 including
employing coal extract as said carbon foam precursor.
37. The method of claim 33 including
employing a material selected from the group consisting of de-ashed coal extract and un-ashed coal extract as said carbon foam precursor.
38. The method of claim 33 including
employing hydrogenated coal extract as said carbonaceous feedstock.
39. The method of claim 33 including
employing hydrogenated coal extract as said carbonaceous feedstock.
40. The method of claim 33 including
employing mesophase pitch as said carbon foam precursor.
41. The method of claim 33 including
employing petroleum based pitch as said carbon foam precursor.
42. The method of claim 33 including
effecting said carbonaceous feedstock oxidation in the presence of at least one material selected from the group consisting of water and steam.
43. The method of claim 33 including
devolatilizing said feedstock prior to said oxidation.
44. The method of claim 33 including
creating said precursor powder in the range of about 10 to 325 mesh.
45. The method of claim 33 including
after said oxidation, but prior to said foaming, storing said oxidized precursor.
46. The method of claim 33 including
effecting said coking at a pressure of about 0.5 to 1.5 atmospheres.
47. The method of claim 33 including
after said coking calcining said material.

* * * * *

UNITED STATES PATENT AND TRADEMARK OFFICE
CERTIFICATE OF CORRECTION

PATENT NO. : 7,553,470 B2
APPLICATION NO. : 10/772920
DATED : June 30, 2009
INVENTOR(S) : Alfred Stiller and Chong Chen It is certified that error appears in the above-identified patent and that said Letters Patent is hereby corrected as shown below:

Column 1, before line 5 and after "METHOD OF CONTROLLING SWELLING AND SHRINKAGE DURING SYNTHESIS OF COKE," insert the following:

--This invention was made with Government support under DOE grant number DE-FC26-02NT41596 awarded by DOE. The Government has certain rights in this invention.--

Signed and Sealed this

Seventeenth Day of November, 2009

David J. Kappos
*Director of the United States Patent and Trademark Office*